United States Patent
Yang et al.

(10) Patent No.: US 7,643,513 B2
(45) Date of Patent: Jan. 5, 2010

(54) METHOD AND SYSTEM FOR AUDIO AND VIDEO TRANSPORT

(75) Inventors: Zhijie Yang, Beijing (CN); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 698 days.

(21) Appl. No.: 11/321,775

(22) Filed: Dec. 29, 2005

(65) Prior Publication Data

US 2007/0121620 A1    May 31, 2007

Related U.S. Application Data

(60) Provisional application No. 60/741,176, filed on Nov. 30, 2005.

(51) Int. Cl.
*H04J 3/06* (2006.01)
*H04H 20/28* (2008.01)

(52) U.S. Cl. .................... 370/503; 370/487
(58) Field of Classification Search ............ 370/485, 370/48, 487, 350, 503, 507, 508, 509, 510, 370/512, 513, 514, 518; 348/464, 423, 512, 348/518; 375/240.28; 725/60, 139
See application file for complete search history.

(56) References Cited

U.S. PATENT DOCUMENTS

| 5,565,924 | A | 10/1996 | Haskell et al. |
| 5,960,006 | A | 9/1999 | Maturi et al. |
| 6,021,168 | A | 2/2000 | Huh |
| 6,041,067 | A * | 3/2000 | Takamori et al. ............ 370/514 |
| 7,174,560 | B1 * | 2/2007 | Crinon ........................ 725/60 |
| 7,315,622 | B2 * | 1/2008 | Mani et al. .................. 380/210 |
| 2002/0118679 | A1 | 8/2002 | Eyer |
| 2005/0018775 | A1 | 1/2005 | Subramanian et al. |
| 2005/0210515 | A1 | 9/2005 | Roh et al. |

* cited by examiner

*Primary Examiner*—Hanh Nguyen
(74) *Attorney, Agent, or Firm*—McAndrews, Held & Malloy, Ltd

(57) ABSTRACT

Aspects of a method and system for processing audio and video transport may comprise synchronizing streams with associated program content based on 24-bit presentation time stamps (PTSs) and 32-bit system clock samples (SCSs) field without using decoding time stamps (DTSs). A PTS field may be provided as part of a packetized elementary stream (PES) packet syntax. An SCS field may be provided as part of a transport stream (TS) syntax. A system clock (STC) may be determined from received SCS values. Video and/or audio data may be decoded as soon as they arrive and when there is at least one display and/or presentation frame buffer available. The video and/or audio data may be presented for display and/or play based on a comparison of the PTS and STC values. When a frame does not have an associated PTS, a PTS extrapolation operation may generate an extrapolated PTS value from previously received PTSs.

27 Claims, 12 Drawing Sheets

METHOD AND SYSTEM FOR AUDIO AND VIDEO TRANSPORT

CROSS-REFERENCE TO RELATED APPLICATIONS/INCORPORATION BY REFERENCE

The application makes reference to, claims priority to, and claims the benefit of U.S. Provisional Application Ser. No. 60/741,176 filed on Nov. 30, 2005.

The above stated application is hereby incorporated herein by reference in its entirety.

FIELD OF THE INVENTION

Certain embodiments of the invention relate to transport of packetized data. More specifically, certain embodiments of the invention relate to a method and system for audio and video transport.

BACKGROUND OF THE INVENTION

The introduction of broadband networks, headend and terminal devices such as set-top boxes, and recording media such as DVD disks recorded with digitally compressed audio, video and data signals, for example, which utilize motion Picture Expert Group (MPEG) compression standards, may provide sound and picture quality that is virtually indistinguishable from the original material. One of the most popular MPEG standards is MPEG-2, which provides the necessary protocols and infrastructure that may be used for delivering digital television or DVD contents with compressed audio, video and data signals. A detailed description of the MPEG-2 standard is published as ISO/IEC Standard 13818. As broadband networks continue to evolve, there is a need to provide access for legacy devices to ensure interoperability with legacy and disparate systems.

An MPEG program may contain a plurality of data streams. For example, it may contain streams of compressed digital video and audio as well as streams for program control information. Video and audio encoders compress video and audio contents, respectively, into elementary streams (ES). In MPEG-2, these streams may encapsulate other information such as decoding and presentation time stamps to generate packetized elementary streams (PES). All these streams may be encoded and multiplexed next into a transport stream (TS) for transmission. The TS may be de-multiplexed and compressed video and audio streams may be decoded in a set-top box (STB) and viewed on a TV. For the entire system, the type of encoding process, including TS encoding, may determine whether another device, for example, a STB, will be able to decode and interpret a received MPEG data stream. In this regard, the other devices may be a legacy or disparate device.

In a typical MPEG data stream, the length of individual ESs may be equivalent to the length of the program. Each ES may be encapsulated in a plurality of variable-length packets called a PES. The PES may include a header that may precede one or more payload bytes. The header may include information pertaining to the encoding process required by the MPEG decoder to decompress and decode a received ES. Each individual ES may have a corresponding PES and any encoded audio and video information may still reside in separate PESs. Notably, the PES may be viewed primarily as a logical construct and is not intended to be utilized for data interchange, transport, and interoperability. Notwithstanding, the PES may be utilized for conversion between two types of system streams, namely, TS and program stream (PS).

The TS and PS may be formed by multiplexing a plurality of PES packets. The TS may include a plurality of additional packets that may contain tables, which may be necessary for de-multiplexing the TS. The tables may be collectively called program specific information (PSI). To maintain synchronization and timing, null packets may also be inserted to fill the intervals between information-bearing packets. Timing information for an associated program may be carried by specific packets. One type of timing information may be called the program clock reference (PCR). The PCR may be located in one of the optional header fields of the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

MPEG-2 Transport Stream (TS) has been widely used in digital video broadcasting. The audio and video synchronization in MPEG-2 TS may require time-stamps, system clock and digital phase-lock loop (D-PLL). Three kinds of time stamps may be created by a single, common system clock in the encoder and carried in the transport stream. Presentation Time Stamps (PTS) may indicate the correct presentation time of audio and video and may comprise 33 bits of information. Decoding Time Stamps (DTS) may indicate the correct decoding time of audio and video and may comprise 33 bits of information. Program Clock References (PCR) may indicate the instantaneous value of the system clock itself at the sampled intervals and may comprise 42 bits of information. In the decoder, these time stamps are extracted. PCRs may be utilized to reconstruct the system clock together with D-PLL, while DTS and PTS may be utilized to control the timing of decoding and presentation of video and/or audio. The use of DTS may result in unnecessary computational complexity and storage cost in the decoder. Moreover, the use of time stamp fields that are longer than 32 bits may also result in additional computational complexity in the decoder since multiple fetches may be required.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for audio and video transport, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for audio and video transport. Aspects of the method and system may comprise synchronizing streams with associated program content based on 24-bit presentation time stamps (PTSs) and 32-bit system clock samples (SCSs) field without using decoding time stamps (DTSs). A PTS field may be provided as part of a packetized elementary stream (PES) packet syntax. An SCS field may be provided as part of a transport stream (TS) syntax. A system clock (STC) may be determined from received SCS values. Video and/or audio data may be decoded as soon as they arrive and when there is at least one display and/or presentation frame buffer available. The video and/or audio data may be presented for display and/or play based on a comparison of the PTS and STC values. When a frame does not have an associated PTS, a PTS extrapolation operation may generate an extrapolated PTS value from previously received PTSs.

Figure 1:
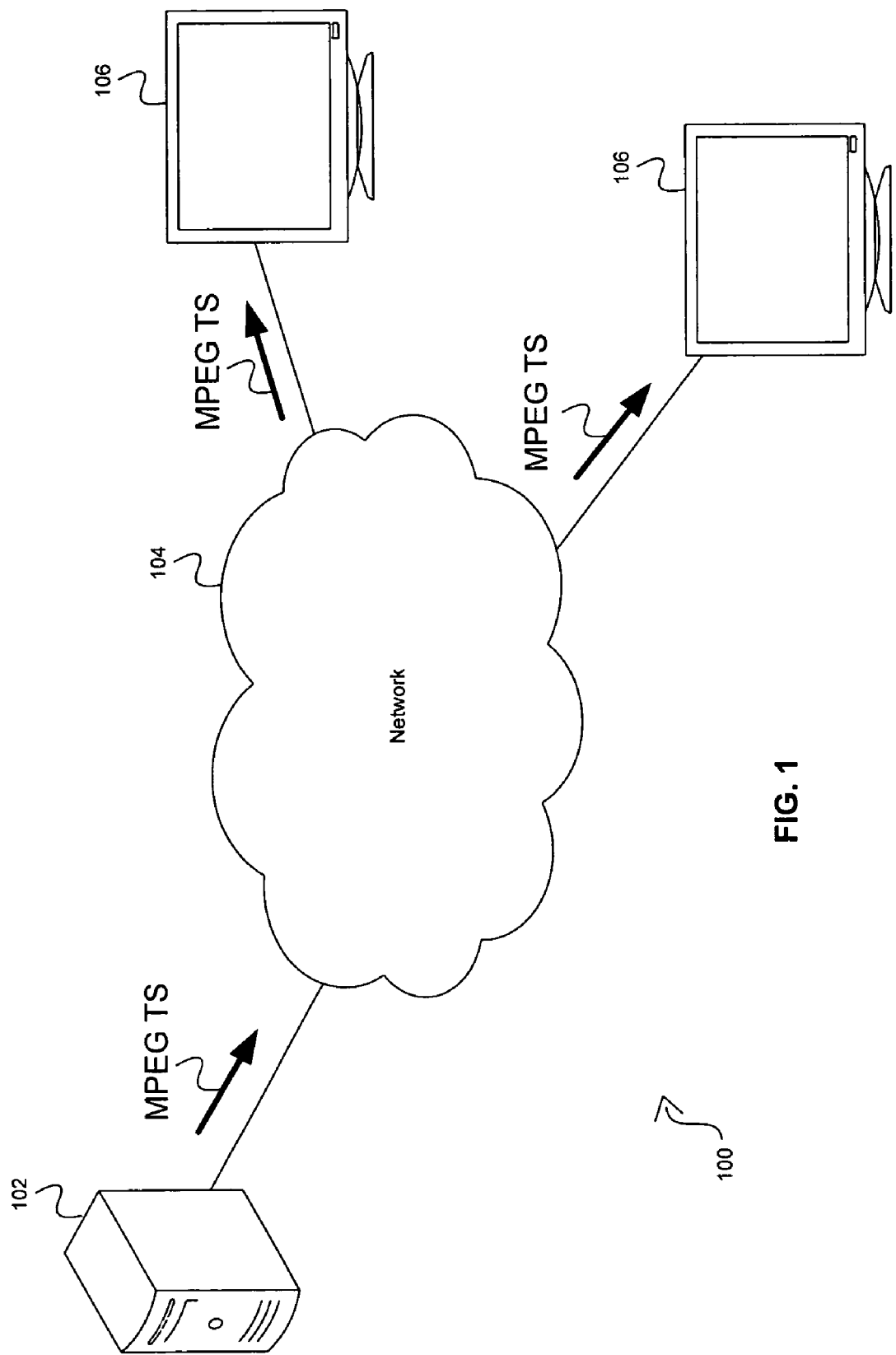
FIG. 1 is a diagram illustrating a motion picture expert group (MPEG) stream transmission network, which may be utilized in connection with an embodiment of the invention.

FIG. 1 is a diagram illustrating a motion picture expert group (MPEG) stream transmission network, which may be utilized in connection with an embodiment of the invention. Referring to FIG. 1, there is shown an MPEG transmission system 100 that may comprise an MPEG server 102, a network 104, and a plurality of audio and/or video display devices 106. The MPEG server 102 may comprise suitable logic, circuitry, and/or code that may enable the transmission of MPEG transport streams (TSs), such as MPEG-2 transport streams, for example, via the network 104. In this regard, the MPEG server 102 may determine which of the plurality of audio and/or video display devices 106 a particular MPEG transport stream is to be transmitted.

The MPEG transport stream may comprise packetized elementary stream packets that may be broken into fixed-sized transport packets. A PES packet may comprise elementary stream (ES) outputs generated by an MPEG audio, video, and/or data encoder, for example. The various forms of ES outputs may include digital control data, sampled and compressed digital audio data, sampled and compressed digital video data, synchronous digital data, and/or asynchronous digital data.

The network 104 may comprise suitable logic, circuitry, and/or code that may enable transmission of MPEG TS from the MPEG server 102 to at least one of the plurality of audio and/or video display devices 106. The network 104 may support transmission of MPEG transport streams over a plurality of links, standards, and/or components. For example, the network 104 may support radio frequency links, digital broadcast satellite links, cable TV networks, standard terrestrial communication links, microwave or laser line of sight links, digital subscriber links, and/or packet-based or cell-based links.

The plurality of audio and/or video display devices 106 may comprise suitable logic, circuitry, and/or code that may enable processing of received MPEG transport streams from the network 104. In this regard, the processing of received MPEG transport streams may comprise processing for displaying video content and/or processing for playing audio content.

The MPEG transmission system 100 may also enable the support of transports streams and/or other packet streams that may be compatible with MPEG-2 streams. In this regard, the MPEG server 102, the network 104, and/or the plurality of audio and/or video display devices 106 may be enabled to process and/or transmit streams that may be compatible with MPEG-2, for example.

Figure 2:
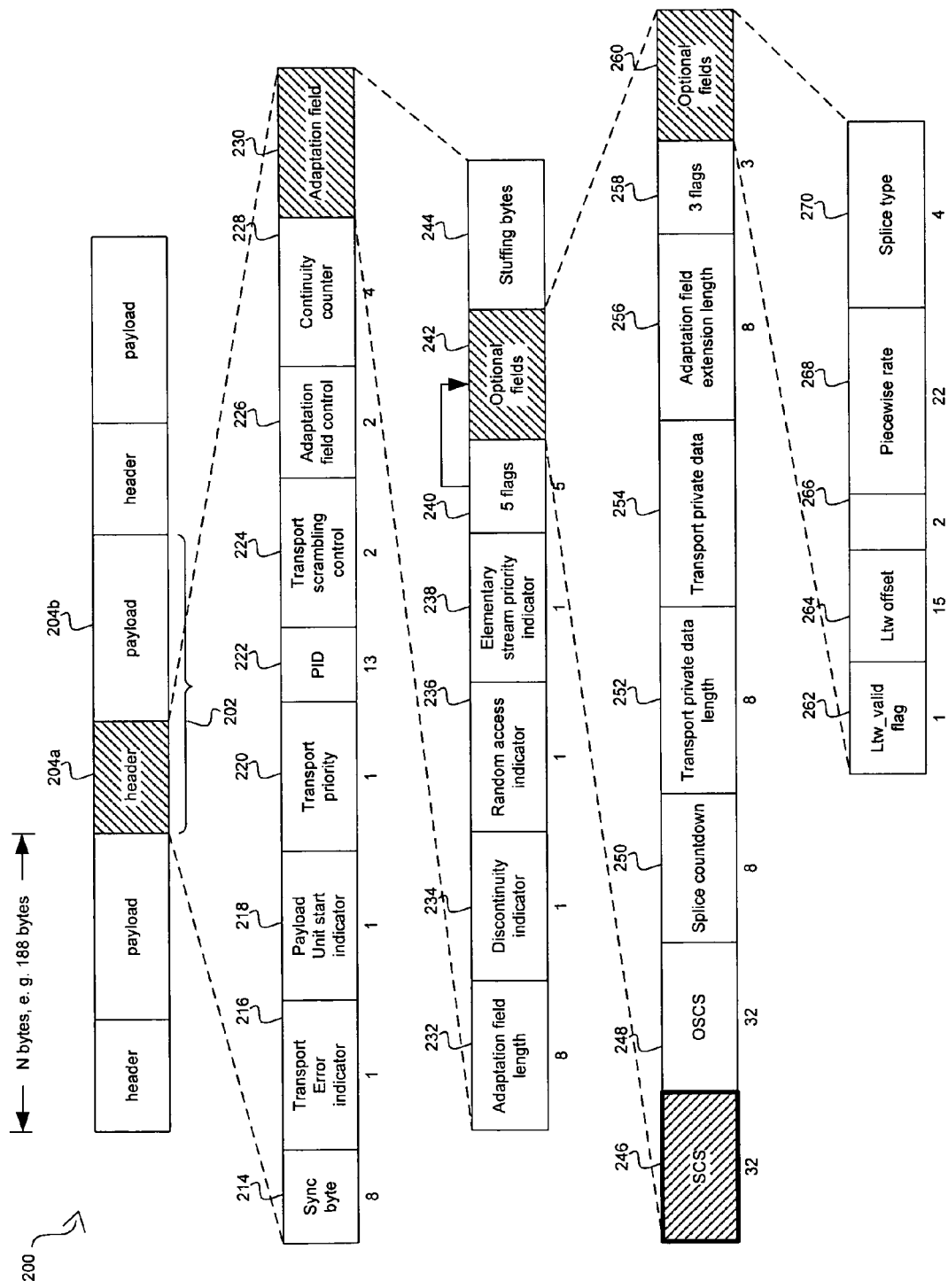
FIG. 2 is a diagram illustrating a transport stream syntax, which may be utilized in accordance with an embodiment of the invention.

FIG. 2 is a diagram illustrating a transport stream syntax, which may be utilized in accordance with an embodiment of the invention. Referring to FIG. 2, there is shown a transport stream syntax 200 that may comprise a plurality of packets 202. Each packet 202 may comprise N bytes of data where, for example, N=188 bytes. Each packet 202 may comprise a header 204a and a payload 204b. The header 204a may comprise a sync byte field 214, a transport error indicator field 216, a payload unit start indicator field 218, and a packet identification (PID) field 222. The header 204a may also comprise a transport scrambling control field 224, an adaptation field control field 226, a continuity counter field 228, and an adaptation field 230. Also shown in FIG. 2 are an exemplary number of bits for at least a portion of the fields comprising the header 204a.

The adaptation field 230 may comprise an adaptation field length field 232, a discontinuity indicator field 234, and a random access indicator field 236. The adaptation field 230 may also comprise an elementary stream priority indicator field 238, a five (5) flags field 240, optional fields 242, and a stuffing bytes field 244. Also shown in FIG. 2 are an exemplary number of bits for at least a portion of the fields comprising the additional field 230.

The optional fields 242 may comprise a system clock sample (SCS) field 246, an original system clock sample (OSCS) field 248, a splice countdown field 250, and a transport private data length field 252. The optional fields 242 may also comprise transport private data field 254, an adaptation field extension length field 256, a three (3) flags field 258, and optional fields 260. Also shown in FIG. 2 are a number of bits for at least a portion of the fields comprising the optional fields 242, such as the 32-bit SCS field 246, for example. The SCS field 246 may correspond to a 32-bit counter of time references associated with a clock operating at about 27 MHz, for example. In some instances, the SCS field 246 may be transmitted at least once every 100 ms, for example.

The optional fields 260 may comprise a legal time window valid (Ltw_valid) flag field 262, an Ltw offset field 264, a two-bit field 266, a piecewise rate field 268, and a splice type field 270. Also shown in FIG. 2, are a number of bits for at least a portion of the fields comprising the optional fields 260.

The transport stream syntax 200 may be compatible with MPEG-2 transport streams when, for example, a 32-bit portion of the PCR field in the MPEG-2 transport stream is considered.

Figure 3A:
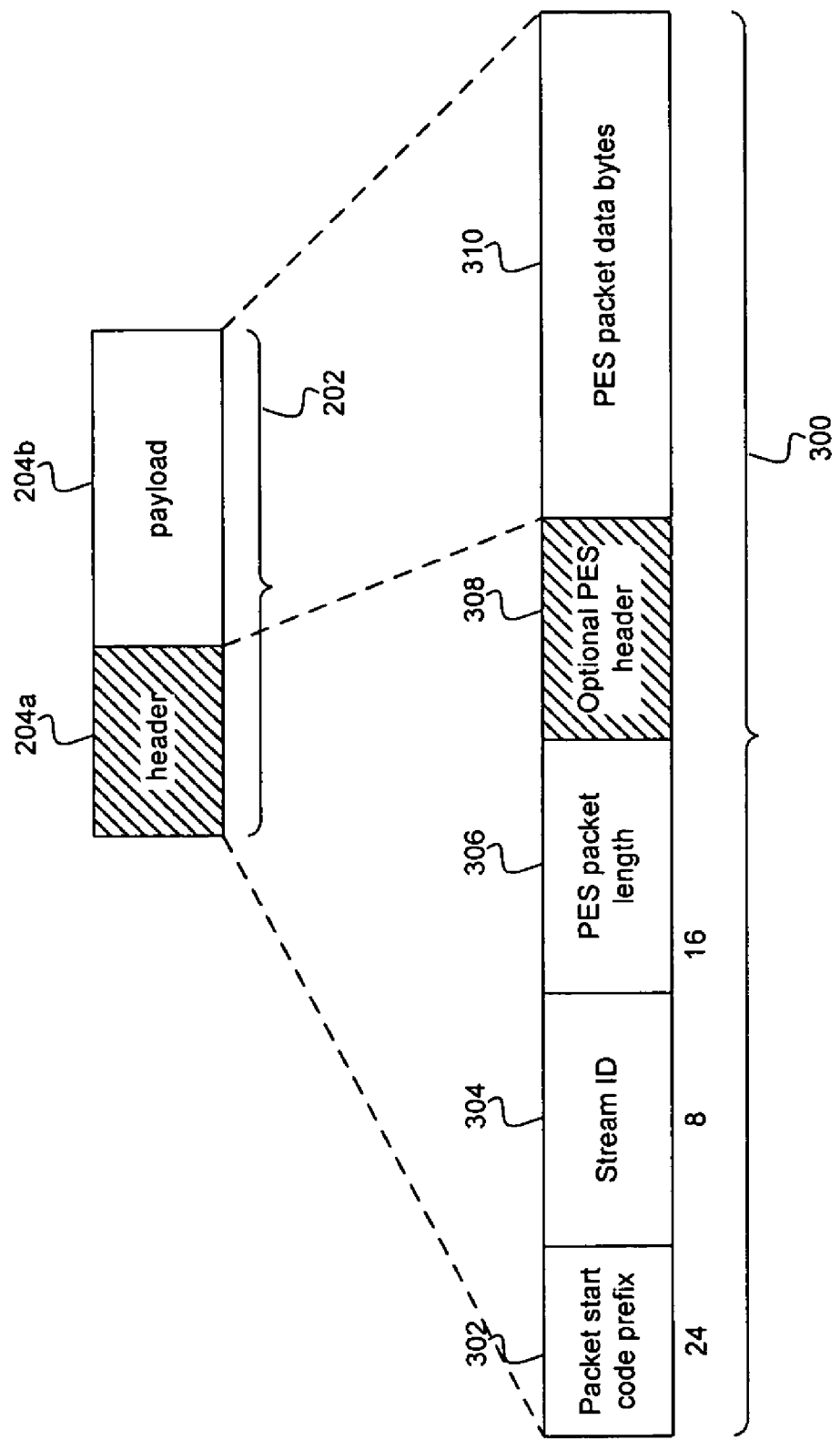
FIG. 3A is a diagram illustrating a mapping for a packetized elementary stream (PES) syntax to a TS syntax, which may be utilized in accordance with an embodiment of the invention.

FIG. 3A is a diagram illustrating a mapping for a packetized elementary stream (PES) syntax to a TS syntax, which may be utilized in accordance with an embodiment of the invention. Referring to FIG. 3A, there is shown a PES packet 300 mapped to the packet 202 in FIG. 2 for transmission using a transport stream. The PES packet 300 may comprise a packet start code prefix field 302, a stream ID field 304, a PES packet length 306, an optional PES header field 308, and a PES packet data types field 310. The PES packet data bytes field 310 of the PES packet 300 may be mapped to the payload 204b of the packet 202. Moreover, the packet start code prefix field 302, the stream ID field 304, the PES packet length 306, and the optional PES header field 308, may be mapped to the header 204a of the packet 202. Also shown in FIG. 3A are an exemplary number of bits for at least a portion of the fields comprising the PES packet 300.

Figure 3B:
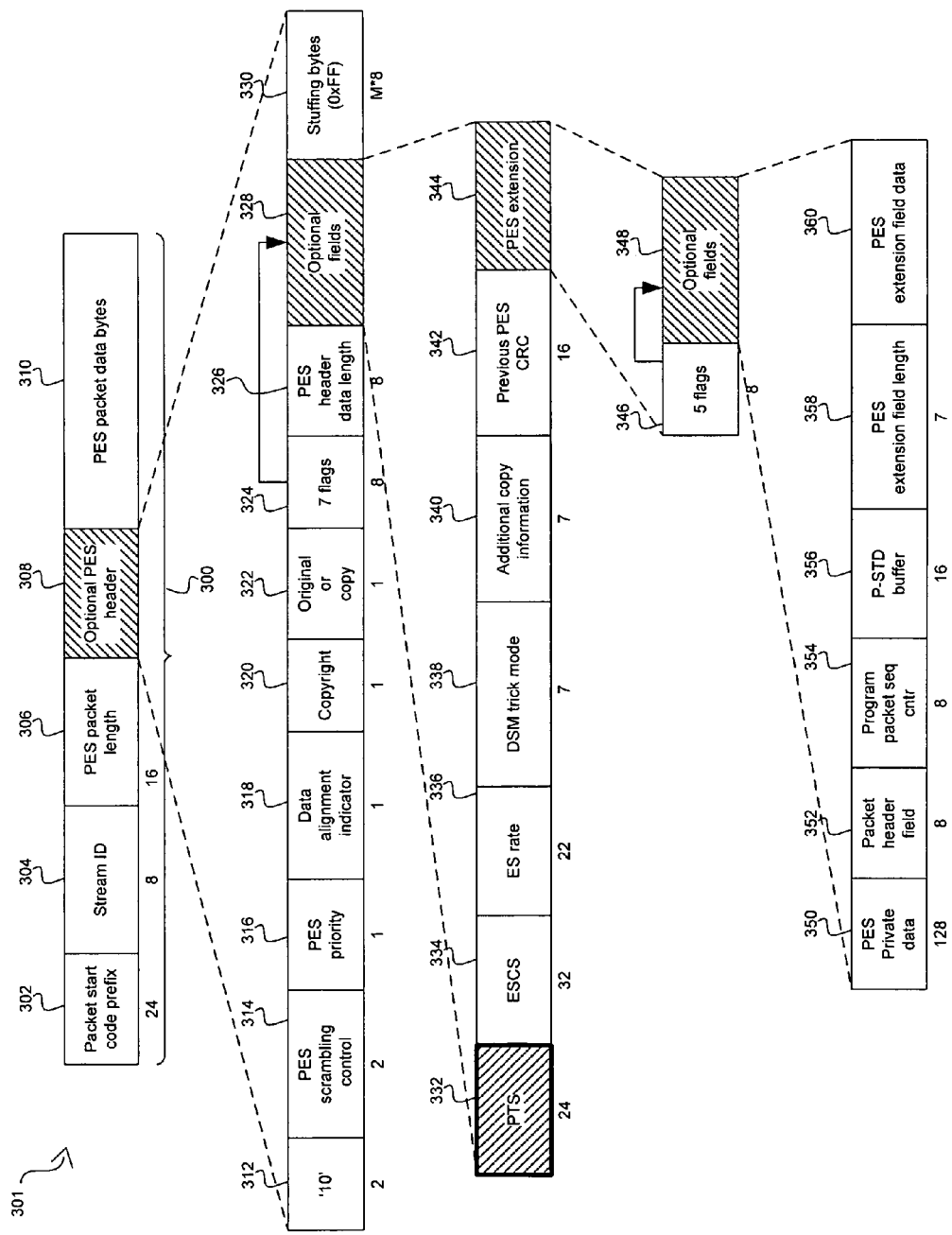
FIG. 3B is a diagram illustrating a packetized elementary stream (PES) syntax, which may be utilized in connection with an embodiment of the invention.

FIG. 3B is a diagram illustrating a PES syntax, which may be utilized in connection with an embodiment of the invention. Referring to FIG. 3B, there is shown a PES syntax 301 that may comprise the PES packet 300 described in FIG. 3A. The optional PES header field 308 in the PES packet 300 may comprise a two-bit '10' field 312, a PES scrambling control field 314, a PES priority field 316, a data alignment indicator 318, and a copyright field 320. The optional PES header field 308 may also comprise an original or copy field filed 322, a seven (7) flags field 324, a PES header data length field 326, optional fields 328, and a stuffing bytes field (330). Also shown in FIG. 3B are exemplary number of bits for at least a portion of the fields comprising the optional PES header 308, such as the M×8-bit stuffing bytes field 330, for example.

The optional fields 328 may comprise a presentation time stamp (PTS) field 332. The PTS field 332 may comprise between about 24 bits and 32 bits of data, for example. The time corresponding to the PTS field 332 may be based on a 90 KHz clock that may result from a 27 MHz reference clock that is divided by 300, for example. In this regard, the maximum value of the PTS field 332 may be obtained from the 32-bit value of the SCS field 246 in FIG. 2 by the expression $(2^{32}-1)/300$. As a result, the value of the PTS field 332 may be provided by 24 bits of data. In some instances, the PTS field 332 may be longer than 24 bits in order to meet design and/or system requirements of a particular implementation. In some instances, the PTS field 332 may be transmitted at least once every 700 ms, for example.

The optional fields 328 may also comprise an end-service consumer system (ESCS) field 334, an elementary stream (ES) rate field 336, a demand site management (DSM) trick mode field 338, an additional copy information field 340, a previous PES cyclic redundancy check (CRC) field 342, and a PES extension field 344. Also shown in FIG. 3B are an exemplary number of bits for at least a portion of the fields comprising the optional fields 328.

The PES extension field 344 may comprise a five (5) flags field 346 and optional fields 348. The optional fields 348 may comprise a PES private data field 350, a packet header field 352, a program packet sequence counter 354, a program system target decoder (P-STD) buffer field 356, a PES extension field length field 358, and a PES extension field data field 360. Also shown in FIG. 3B are an exemplary number of bits for at least a portion of the fields comprising the PES extension field 344 and the optional fields 348.

The PES syntax 301 may be compatible with MPEG-2 PES packet structures when, for example, a 24-bit portion of the PTS field in the MPEG-2 PES packet structure is considered. For example, an MPEG-2 PES may be converted to new PES format by simply setting the leading 9 bits of the PTS field to 0, removing DTS, and by setting the LSB of PTS_DTS_Flags to 0. In such way, the new PES may still be a backward compatible and legal MPEG-2 PES.

Figure 4A:
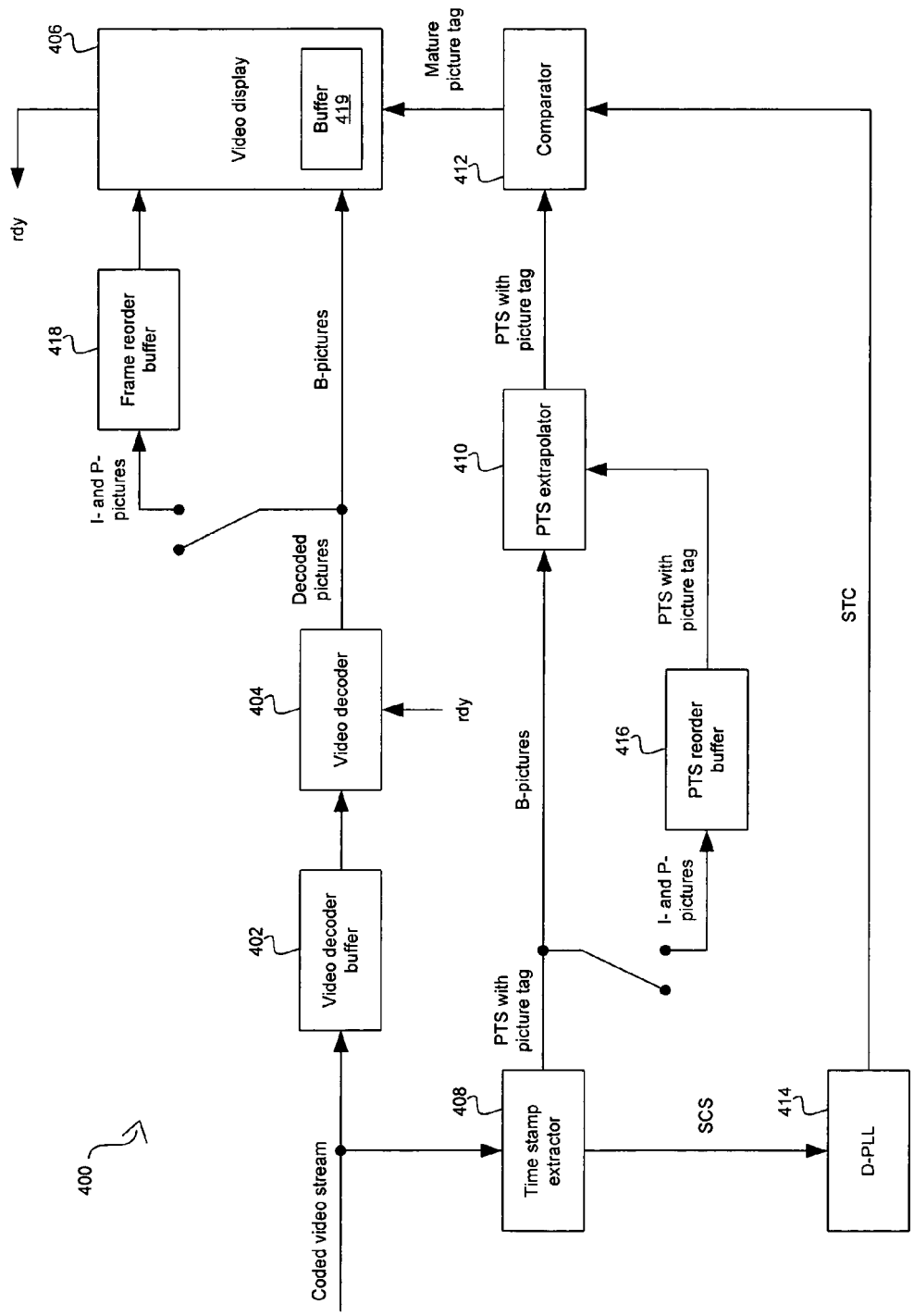
FIG. 4A shows a diagram illustrating exemplary video transport decoding and displaying, which may be utilized in accordance with an embodiment of the invention.

FIG. 4A shows a diagram illustrating exemplary video transport decoding and displaying, which may be utilized in accordance with an embodiment of the invention. Referring to FIG. 4A, there is shown a video decoding and displaying system 400 that may comprise a video decoder buffer 402, a video decoder 404, a video display 406, a time stamp extractor 408, a presentation time stamp extrapolator 410, a comparator 412, a digital phase locked loop (D-PLL) 414, a PTS reorder buffer 416, and a frame reorder buffer 418. The video display 406 may comprise a buffer 419.

The video decoder buffer 402 may comprise suitable logic, circuitry, and/or code that may enable storage of at least a portion of the coded video stream that is received by the video decoding and displaying system 400. The coded video stream may comprise I-pictures, B-pictures, and/or P-pictures. I-pictures or intra-coded pictures may correspond to frames of video information that are coded independently of other frames. A reconstructed I-picture may be utilized as an anchor for reconstructing B-pictures and P-pictures. A P-picture or predicted picture may be predicted from the most recent anchor picture and may be utilized as a new anchor picture. A B-picture or bidirectionally predicted picture may be predicted by averaging motion-compensated elements of a past anchor and motion-compensated elements of a future anchor.

The video decoder 404 may comprise suitable logic, circuitry, and/or code that may enable decoding or reconstructing pictures from the coded video stream stored in the video decoder buffer 402. The video decoder 404 may be enabled to decode the next video frame when a signal, such as a ready (rdy) signal, is asserted. The decoded B-pictures generated by the video decoder 404 may be communicated directly to the video display 406. The decoded I-pictures and P-pictures generated by the video decoder 404 may be communicated to the video display 406 via the frame reorder buffer 418. The decoding operations in the video decoder 404 may be performed without the need for a decoding time stamp (DTS) field value when a coded or compressed picture is completely received in the video decoder buffer 402, or in a video buffer verifier (VBV), and when there is a frame buffer available for decoding. A VBV may correspond to a decoder buffer that may not overflow or underflow when fed a conforming MPEG bit stream.

The frame reorder buffer 418 may comprise suitable logic, circuitry, and/or code that may enable ordering the sequence of decoded I-pictures and P-pictures received from the video decoder 404 to communicate the decoded pictures to the video display 406 in the appropriate order for display. The video display 406 may comprise suitable logic, circuitry, and/or code that may enable displaying or presenting the decoded I-pictures, B-pictures, and/or P-pictures in the appropriate sequence. The video display 406 may store decoded video pictures received from the video decoder 404 or from the frame reorder buffer 418 in the buffer 419. The video display 406 may also enable generating a signal, such as the rdy signal, to indicate to the video decoder 404 that the buffer 419 is available to store an additional decoded picture and that the video decoder 404 may decode a next picture.

The time stamp extractor 408 may comprise suitable logic, circuitry, and/or code that may enable the extraction of the PTS field 332 from a PES packet 300 as in FIG. 3B and/or the SCS field 246 from a packet 200 as in FIG. 2 from the coded video stream. When a coded picture is received, a picture tag number may be determined, and if the PTS field is present, PTS flag is set to 1 and the PTS value is extracted from the PTS field, otherwise PTS flag is set to 0. The maximum value of the picture tag number may be based on the maximum number of allowed reference pictures and the maximum number of allowed frames in the buffer 419, which may depend on a specific implementation. In this regard, PTS_flags, PTS values, and picture tag numbers associated with B-pictures may be communicated from the time stamp extractor 408 to the PTS extrapolator 410. The time stamp extractor 408 may communicate the SCS information in the SCS field 246 to the D-PLL 414. The D-PLL 414 may comprise suitable logic, circuitry, and/or code that may enable extracting and/or generating the system time clock (STC) from the information in the SCS field 246. In this regard, the STC may correspond to a clock operating at about 27 MHz. For example, the STC may correspond to a clock operating at 27 MHz+/−810 Hz or +/−30 ppm. The D-PLL 414 may communicate the value of the STC to the comparator 412.

When, for example, a SCS discontinuity bit, such as a discontinuity_indicator in the SCS field 32 is seen in the incoming transport stream, the new SCS value may be communicated to a local STC of the D-PLL 414. In this regard, the PTS value of the pictures already in the video decoder buffer 402 and the buffer 419 may no longer be valid and these pictures may be displayed synchronized to a vertical synchronization signal, such as a vsync signal, from the video display 406.

When the D-PLL 414 detects that an error between a new SCS value and the existing STC value may be larger than a programmable threshold, the new SCS value may be communicated to a local STC of the D-PLL 414. In this regard, the PTS value of the pictures already in the video decoder buffer 402 and the buffer 419 may no longer be valid and these pictures may be displayed synchronized to a vertical synchronization signal, such as a vsync signal, from the video display 406.

The PTS reorder buffer 416 may comprise suitable logic, circuitry, and/or code that may enable ordering the sequence of PTS values associated with I-pictures and P-pictures to be communicated to the PTS extrapolator 410. The operations of the PTS reorder buffer 416 may correspond to a memory address pointer relabel for frame buffers.

The PTS extrapolator 410 may comprise suitable logic, circuitry, and/or code to generate an extrapolated PTS when no PTS value is associated a decoded picture. The PTS extrapolator 410 may communicate PTS values and extrapolated PTS values, when necessary, that are associated with decoded pictures in the appropriate display order of the decoded pictures to the comparator 412.

The comparator 412 may comprise suitable logic, circuitry, and/or code that may enable comparing the PTS value and the STC value in order to determine whether the next decoded picture may be displayed. When the PTS value and the STC value match, the next decoded picture is referred to as a mature picture and the comparator 412 may generate a signal to the video display 406 to display or present the next decoded picture stored in the buffer 419 that is available for display. When the video display 406 completes displaying or presenting the decoded picture in the buffer 419, the video display 406 may assert the rdy signal to indicate to the video decoder 404 that the following coded picture from video decoder buffer 402 may be decoded.

The operation of the video decoding and displaying system 400 may be referred to as a single queue approach where the PTS_flag, PTS value, picture tag number of a compressed or coded picture and the compressed or coded picture may be pushed into a data buffer together. In some instances, this approach may result in simpler implementations than may be achieved with a double queue approach.

Figure 4B:
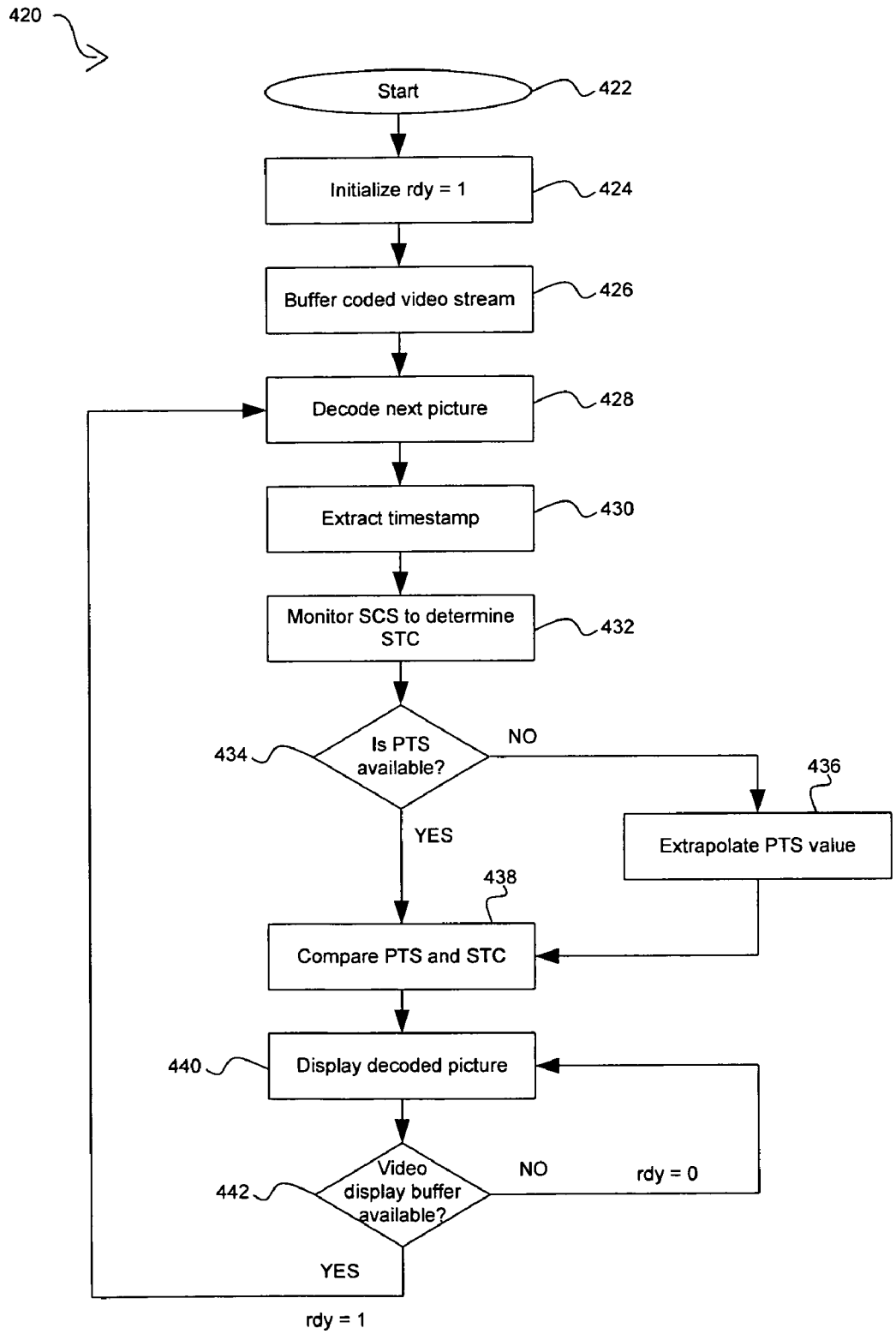
FIG. 4B is a flow diagram illustrating exemplary steps for video presentation synchronization, which may be utilized in accordance with an embodiment of the invention.

FIG. 4B is a flow diagram illustrating exemplary steps for video presentation synchronization, which may be utilized in accordance with an embodiment of the invention. Referring to FIG. 4B, there is shown a flow diagram 420 for an exemplary operation of the video decoding and displaying system 400 in FIG. 4A. In step 424, after start step 422, the rdy signal generated by the video display 406 may be initialized by asserting the signal such that rdy=1, for example. In step 426, the video decoder buffer 402 may buffer a portion of the coded video stream.

In step 428, when the signal rdy is asserted, the video decoder 404 may decode a next picture from the video decoder buffer 402. After the decoding of the next picture is completed, the decoded picture may be communicated to the buffer 419 in the video display 406. In this regard, when the decoded picture is a B-picture, the decoded picture may be communicated to the buffer 419 in the video display 406. When the decoded picture is either an I-picture or a P-picture, the decoded picture may be communicated to buffer 419 via the frame reorder buffer 416 where the decoded pictures may be appropriately ordered for display. After a decoded picture is communicated to the buffer 419 in the video display 406, the video display 406 may deassert the rdy signal, that is, rdy=0, when there is not enough memory available in the buffer 419 to receive additional decoded pictures.

In step 430, the time stamp extractor 408 may extract the PTS field information and/or SCS field information from the coded video stream. The PTS field value associated with B-pictures may be communicated to the PTS extrapolator 410. The PTS value associated with I-pictures and P-pictures may be communicated to the PTS extrapolator 410 via the PTS reorder buffer 416 where the PTS values may be appropriately ordered to correspond to the display order of the decoded pictures. In step 432, the SCS field value may be communicated to the D-PLL 414 to determine the value of the STC. In this regard, the time stamp extractor 408 and the D-PLL 414 monitor the SCS value to generate the value of the STC. The value of the STC generated by the D-PLL 414 may be communicated to the comparator 412.

In step 434, when the PTS field to be associated with a decoded picture is not received, the process may proceed to step 436. In step 436, a PTS field value for an I-picture, a P-picture, or a B-picture may be extrapolated in the PTS extrapolator 410 from previously received PTS field values. When the PTS field value is generated, the process may proceed to step 438.

Returning to step 434, when the PTS field to be associated with a decoded picture is received, the process may proceed to step 438. In step 438, the comparator 412 may compare the PTS field value and the STC value to determine whether the values match. When the values do not match, the decoded picture associated with the PTS value is not mature and the comparator 412 may indicate to the video display 406 not to display the decoded picture. When the PTS field value and the STC value match, the decoded picture associated with the PTS value is mature and the comparator 412 may indicate to the video display 406 to display the decoded picture. In step 440, the video display 406 may display the next decoded picture in the buffer 419 that is available for display.

In step 442, the video display 406 may determine whether another decoded picture may be stored in the buffer 419. When another decoded picture may be stored in the buffer 419, the video display 406 may assert the rdy signal and the process may return to step 428. When another decoded picture may not be stored in the buffer 419, the process may proceed to step 440 where the next decoded picture in the buffer 419 that is available for display may be displayed by the video display 406. Displaying the next decoded picture may result in sufficient memory becoming available in the buffer 419 to receive additional decoded pictures.

Figure 4C:
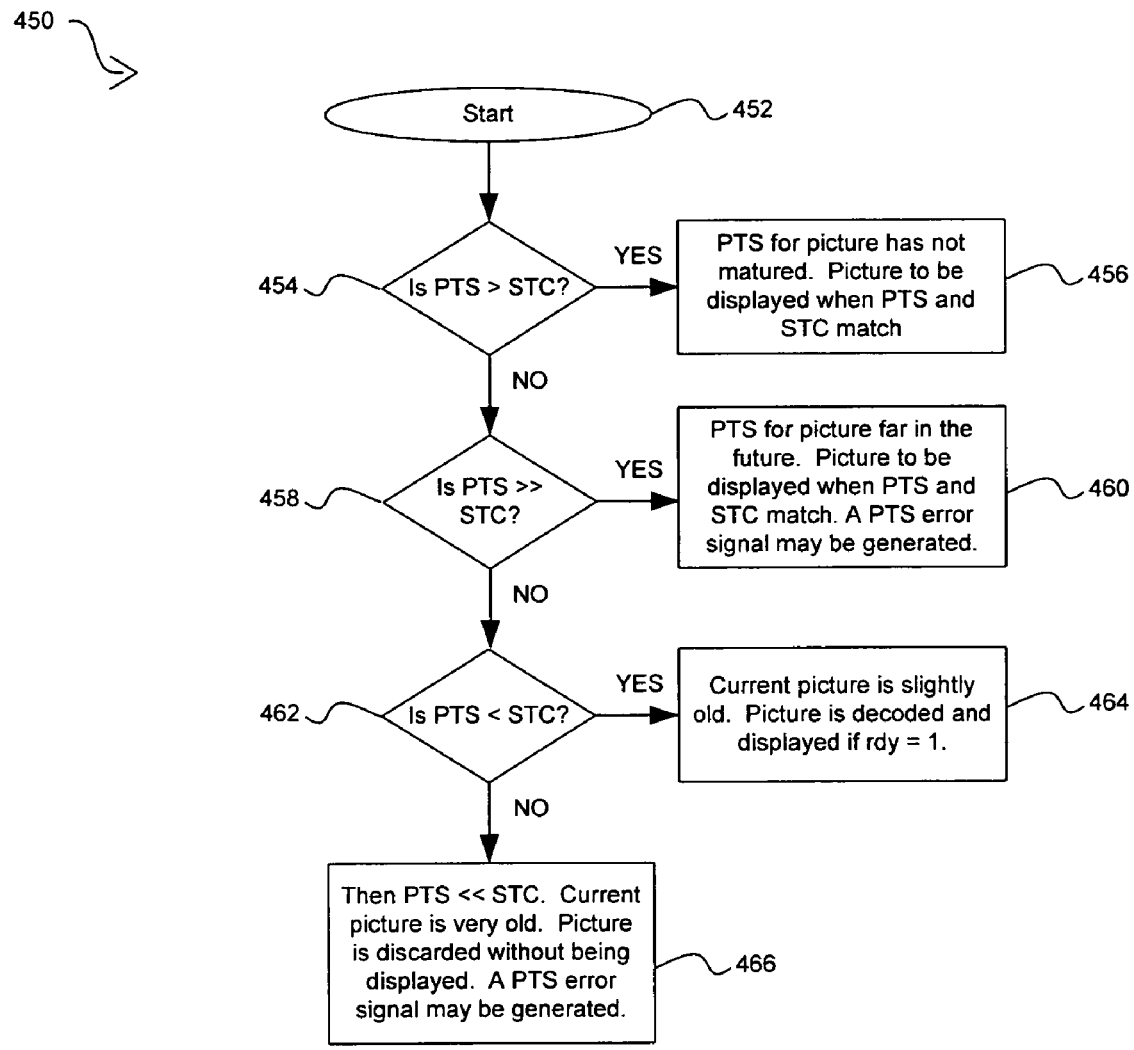
FIG. 4C is a flow diagram illustrating exemplary steps for handling the system clock (STC) and the presentation time stamp (PTS) mismatch in video transport, which may be utilized in accordance with an embodiment of the invention.

FIG. 4C is a flow diagram illustrating exemplary steps for handling the system clock (STC) and the presentation time stamp (PTS) mismatch in video transport, which may be utilized in accordance with an embodiment of the invention. Referring to FIG. 40, there is shown a flow diagram 450 of an exemplary thresholds for handling of the STC and the PTS mismatch by the video decoder 404 in FIG. 4A. In step 454, after start step 452, when the comparator 412 determines that PTS>STC, the process may proceed to step 456, otherwise the process may proceed to step 458. In step 456, the comparator 412 may determine that the PTS value for the current picture to be decoded has not matured. In this regard, the current picture to be decoded may be decoded by the video decoder 404 but may not be displayed by the video display 406 until the PTS and STC values match.

In step 458, when the comparator 412 determines that PTS STC, the process may proceed to step 460, otherwise the process may proceed to step 462. In step 460, the comparator 412 may determine that the PTS for the current picture to be decoded is very far in the future. In this regard, the current picture to be decoded may be decoded by the video decoder 404 but may not be displayed by the video display 406 until the PTS and STC values match. A PTS error signal may be generated by the comparator 412 to indicate this condition and to have the STC value reloaded in order to at least partially correct for the difference between the PTS and STC values. A host processor may reload the STC value, for example.

In step 462, when the comparator 412 determines that PTS<STC, the process may proceed to step 464, otherwise the process may proceed to step 466. In step 464, the comparator 412 may determine that the current picture to be decoded is old. In this regard, the current picture to be decoded may be decoded by the video decoder 404, if the rdy signal is asserted, that is, rdy=1, for example, and may be displayed by the video display 406.

In step 466, when the comparator 412 determines that PTS<<STC, the current picture to be decoded is very old. The current picture to be decoded by the video decoder 404 may be discarded without being displayed by the video display 406. A PTS error signal may be generated by the comparator 412 to indicate this condition.

Figure 4D:
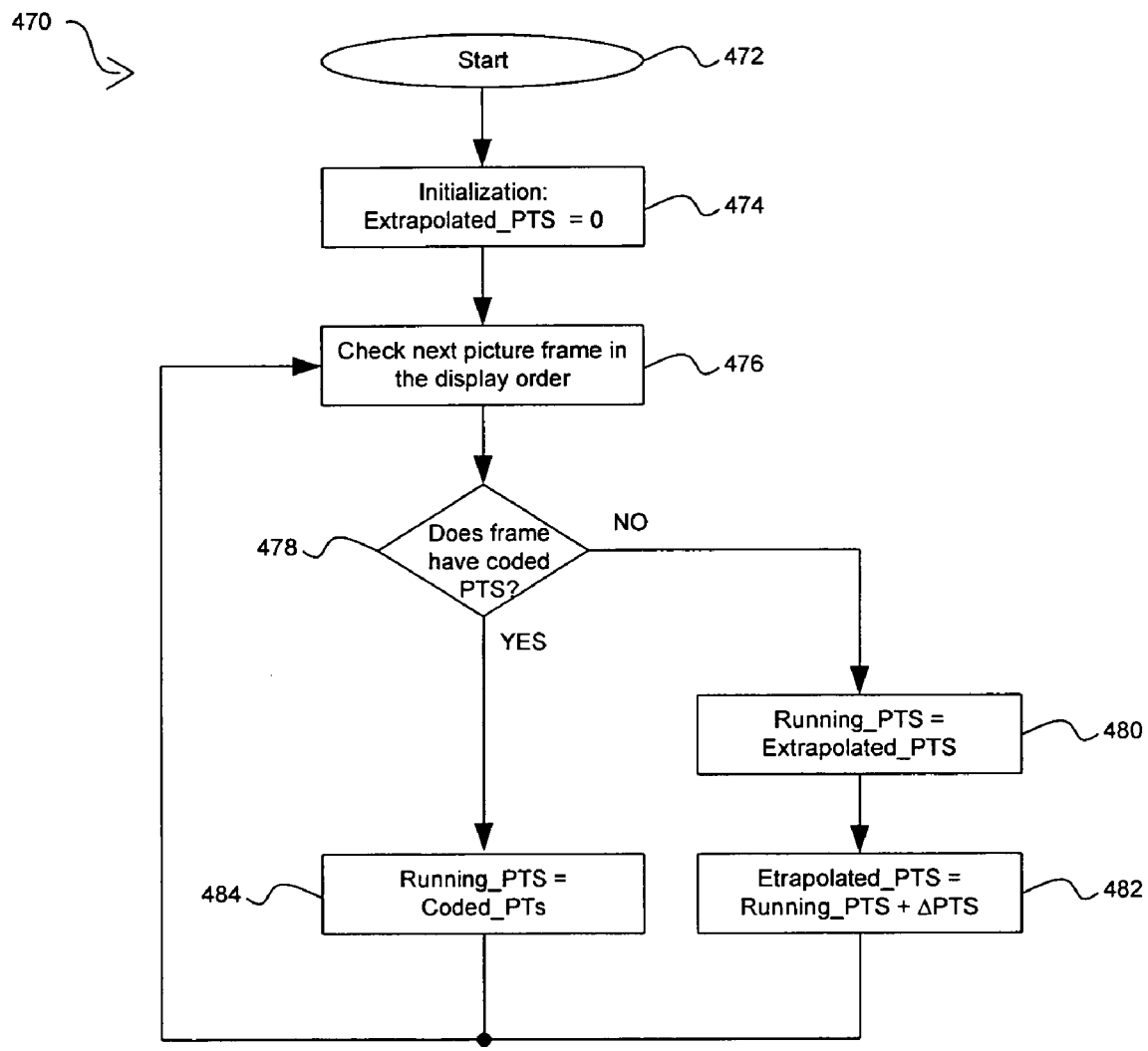
FIG. 4D is a flow diagram illustrating exemplary steps for presentation time stamp (PTS) extrapolation for pictures without PTS fields, which may be utilized in accordance with an embodiment of the invention.

FIG. 4D is a flow diagram illustrating exemplary steps for presentation time stamp (PTS) extrapolation for pictures without PTS fields, which may be utilized in accordance with an embodiment of the invention. Referring to FIG. 4D, there is shown a flow diagram 470 of an exemplary extrapolation operation by the PTS extrapolator 410 in FIG. 4A. In step 474, after start step 472, the PTS extrapolator 410 may initialize the extrapolated PTS value, Extrapolated_PTS, to zero, for example. In step 476, the video decoding and displaying system 400 may check the PTS field of the next picture frame in the display order. In step 478, when the coded picture frame does not have a corresponding coded PTS field value, Coded_PTS, the process may proceed to step 480. In step 480, the PTS extrapolator 410 may assign to a current PTS value, Running_PTS, the current value of Extrapolated_PTS. In step 482, the PTS extrapolator 410 may generate a new value for Extrapolated_PTS that may be given by the following expression:

$$\text{Extrapolated\_PTS} = \text{Running\_PTS} + \Delta \text{PTS}. \quad (1)$$

In equation (1), the value of $\Delta$PTS may be given by the expression:

$$\Delta PTS = \begin{cases} \text{repeat\_count} \times \dfrac{90000}{\text{frame\_rate}}, & \text{for frame pictures} \\ \dfrac{45000}{\text{frame\_rate}}, & \text{for field pictures} \end{cases}, \quad (2)$$

where frame_rate corresponds to the frame rate of the coded video stream and repeat_count corresponds to the repeat pattern of the frame display. For example, for video streams that may be compatible with MPEG-2 video or with AVS 1.0 Part 2, the value of repeat_count may be based on the values for parameters progressive_sequence, repeat_first_field and/or top_field_first as follows:

$$\text{repeat\_count} = \begin{cases} 3, & \text{if progressive\_sequence} = \text{repeat\_first\_field} = \text{top\_field\_first} = 1 \\ 2, & \text{if progressive\_sequence} = \text{repeat\_first\_field} = 1, \text{top\_field\_first} = 0 \\ 1.5, & \text{if progressive\_sequence} = 0, \text{progressive\_frame} = \text{repeat\_first\_field} = 1 \\ 1, & \text{otherwise.} \end{cases}$$

For the coded picture frames that do not have a corresponding coded PTS field value, the PTS extrapolator 410 may communicate to the comparator 412 the value of Extrapolated_PTS generated in equation (1).

Returning to step 478, when the coded picture frame does have a corresponding PTS field value, the process may proceed to step 484. In step 484, the PTS extrapolator 410 may assign the current PTS value the coded PTS field value, that is, $$\text{Running\_PTS} = \text{Coded\_PTS}. \quad (3)$$

For the coded picture frames that have a corresponding coded PTS field value, the PTS extrapolator 410 may communicate to the comparator 412 the value of Running_PTS generated in equation (3).

In some instances, coded pictures in the video decoder buffer 402 may be dropped without decoding as a result of buffer overflow. One approach may comprise dropping the last picture in the video decoder buffer 402. This approach may not be utilized when the dropped picture may be used as reference or anchor for decoding the following pictures. Another approach may comprise dropping the coded pictures according to frame dependency, for example, by determining the picture type of each coded picture in the video decoder buffer 402. In this regard, the last B-picture in the video decoder buffer 402 may be dropped first. When there are not B-pictures in the video decoder buffer 402, the last P-picture may be dropped before any I-picture. When there are no I-pictures in the video decoder buffer 402, drop the last I-picture. For video decoder buffer 402 underflow conditions, the video decoder 404 may wait a pre-determined amount of time for an incoming coded picture to be completely stored in the video decoder buffer 402 before initiating decoding operations.

Figure 5A:
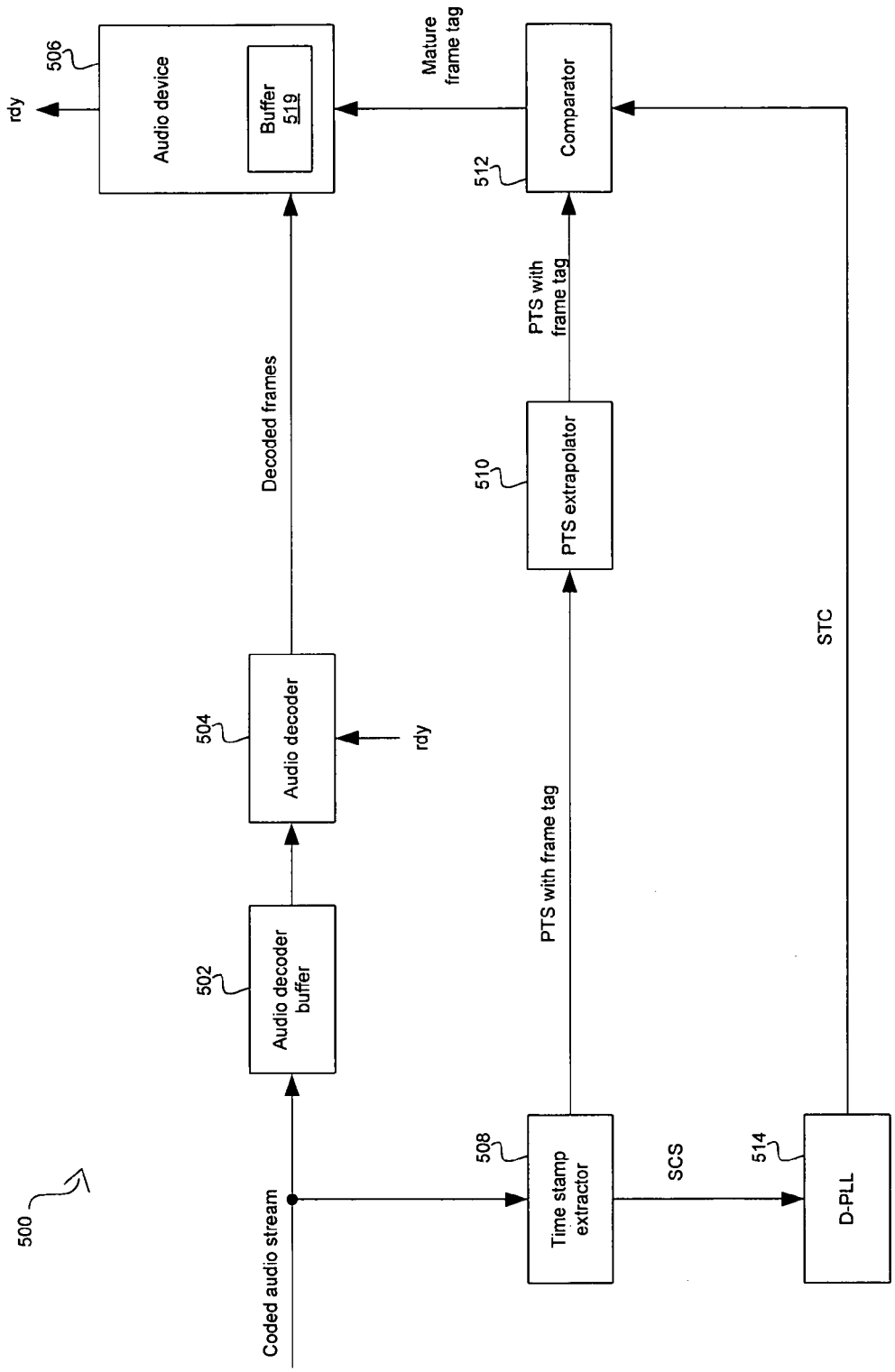
FIG. 5A shows a diagram illustrating exemplary audio transport decoding and playing, which may be utilized in accordance with an embodiment of the invention.

FIG. 5A shows a diagram illustrating exemplary audio transport decoding and playing, which may be utilized in accordance with an embodiment of the invention. Referring to FIG. 5A, there is shown an audio decoding and presentation system 500 that may comprise an audio decoder buffer 502, an audio decoder 504, an audio device 506, a time stamp extractor 508, a presentation time stamp extrapolator 510, a comparator 512, and a digital phase locked loop (D-PLL) 514. The audio device 506 may comprise a buffer 519.

The audio decoder buffer 502 may comprise suitable logic, circuitry, and/or code that may enable storage of at least a portion of the coded audio stream that is received by the audio decoding and presentation system 500. The coded audio stream may comprise coded audio frames. The audio decoder 504 may comprise suitable logic, circuitry, and/or code that may enable decoding or reconstructing audio frames from the coded audio stream stored in the audio decoder buffer 502. The audio decoder 504 may be enabled to decode the next audio frame when a signal, such as a ready (rdy) signal, is asserted. The decoded audio frames generated by the audio decoder 504 may be communicated to the audio device 506. The audio device 506 may comprise suitable logic, circuitry, and/or code that may enable playing or presenting the decoded audio frames. The audio device 506 may store decoded audio frames received from the audio decoder 504 in the buffer 519. The audio device 506 may also enable generating a signal, such as the rdy signal, to indicate to the audio decoder 504 that the buffer 519 is available to store an additional decoded audio frame and that the audio decoder 504 may decode a next coded audio frame.

The time stamp extractor 508 may comprise suitable logic, circuitry, and/or code that may enable the extraction of the PTS field 332 from a PES packet 300 as in FIG. 3B and/or the SCS field 246 from a packet 200 as in FIG. 2 from the coded audio stream. When a coded audio frame is received, a frame tag number may be determined, and if the PTS field is present, PTS flag is set to 1 and the PTS value is extracted from the PTS field, otherwise PTS flag is set to 0. The maximum value of the frame tag number may be based on the maximum number of allowed frames in the buffer 519, which may depend on specific implementation. In this regard, PTS_flags, PTS values and associated frame tags may be communicated from the time stamp extractor 508 to the PTS extrapolator 510. The time stamp extractor 508 may communicate the SCS information in the SCS field 246 to the D-PLL 514. The D-PLL 514 may comprise suitable logic, circuitry, and/or code that may enable extracting and/or generating the system time clock (STC) from the information in the SCS field 246. In this regard, the STC may correspond to a clock operating at about 27 MHz. For example, the STC may correspond to a clock operating at 27 MHz+/−810 Hz or +/−30 ppm. The D-PLL 514 may communicate the value of the STC to the comparator 512.

The PTS extrapolator 510 may comprise suitable logic, circuitry, and/or code to generate an extrapolated PTS when no PTS value is associated a decoded audio frame. The PTS extrapolator 510 may communicate PTS values and extrapolated PTS values that are associated with decoded audio frames to the comparator 512. The comparator 512 may comprise suitable logic, circuitry, and/or code that may enable comparing the PTS value and the STC value in order to determine whether the next decoded audio frame may be played or presented. When the PTS value and the STC value match, the next decoded audio frame is referred to as a mature audio frame and the comparator 512 may generate a signal to the audio device 506 to play or present the next decoded audio frame stored in the buffer 519 that is available for playing or presentation. When the audio device 506 completes playing or presenting the decoded audio frame in the buffer 519, the audio device 506 may assert the rdy signal to indicate to the audio decoder 504 that the following coded audio frame from the audio decoder buffer 502 may be decoded.

The operation of the audio decoding and presentation system 500 may be referred to as a single queue approach where the PTS_flag, PTS value, frame tag number of a compressed or coded audio frame and the compressed or coded audio frame may be pushed into a data buffer together. In some instances, this approach may result in simpler implementations than may be achieved with a double queue approach.

Figure 5B:
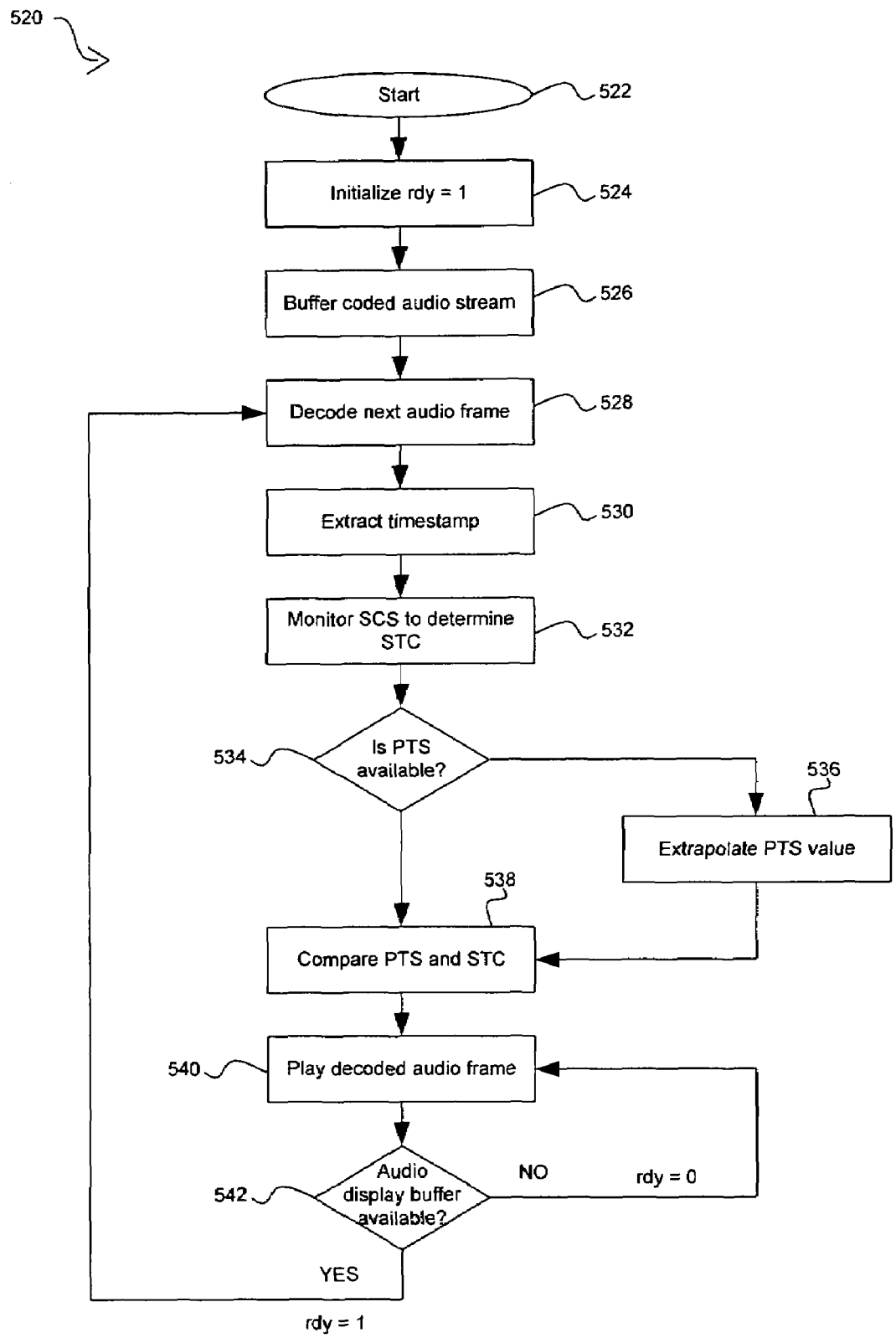
FIG. 5B is a flow diagram illustrating exemplary steps for audio presentation synchronization, which may be utilized in accordance with an embodiment of the invention.

FIG. 5B is a flow diagram illustrating exemplary steps for audio presentation synchronization, which may be utilized in accordance with an embodiment of the invention. Referring to FIG. 5B, there is shown a flow diagram 520 for an exemplary operation of the audio decoding and presentation system 500 in FIG. 5A. In step 524, after start step 522, the rdy signal generated by the audio device 506 may be initialized by asserting the signal such that rdy=1, for example. In step 526, the audio decoder buffer 502 may buffer a portion of the coded audio stream.

In step 528, when the signal rdy is asserted, the audio decoder 504 may decode a next audio frame from the audio decoder buffer 502. After the decoding of the next audio frame is completed, the decoded audio frame may be communicated to the buffer 519 in the audio device 506. After a decoded audio frame is communicated to the buffer 519 in the audio device 506, the audio device 506 may deassert the rdy signal, that is, rdy=0, when there is not enough memory available in the buffer 519 to receive additional decoded audio frames.

In step 530, the time stamp extractor 508 may extract the PTS field information and/or SCS field information from the coded audio stream. The PTS field value associated with audio frames may be communicated to the PTS extrapolator 510. In step 532, the SCS field value may be communicated to the D-PLL 514 to determine the value of STC. In this regard, the time stamp extractor 508 and the D-PLL 514 monitor the SCS value to generate the value of STC. The value of STC generated by the D-PLL 514 may be communicated to the comparator 512.

In step 534, when the PTS field to be associated with a decoded audio frame is not received, the process may proceed to step 536. In step 536, a PTS field value for an audio frame may be extrapolated in the PTS extrapolator 510 from previously received PTS field values. When the PTS field value is generated, the process may proceed to step 538.

Returning to step 534, when the PTS field that is to be associated with a decoded audio frame is received, the process may proceed to step 538. In step 538, the comparator 512 may compare the PTS field value and the STC value to determine whether the values match. When the values do not match, the decoded audio frame associated with the PTS value is not mature and the comparator 512 may indicate to the audio device 506 not to play the decoded audio frame.

When the PTS field value and the STC value match, the decoded audio frame associated with the PTS value is mature and the comparator 512 may indicate to the audio device 506 to play or present the decoded audio frame. In step 540, the audio device 506 may play or present the next decoded audio frame in the buffer 419 that is available for playing and displaying.

In step 542, the audio device 506 may determine whether another decoded audio frame may be stored in the buffer 519. When another decoded audio frame may be stored in the buffer 519, the audio device 506 may assert the rdy signal and the process may return to step 528. When another decoded audio frame may not be stored in the buffer 519, the process may proceed to step 540 where the next decoded audio frame in the buffer 419 that is available for playing or presentation may be played or presented by the audio device 506. Playing or presenting the next decoded audio frame may result in sufficient memory becoming available in the buffer 519 to receive additional decoded audio frames.

Figure 5C:
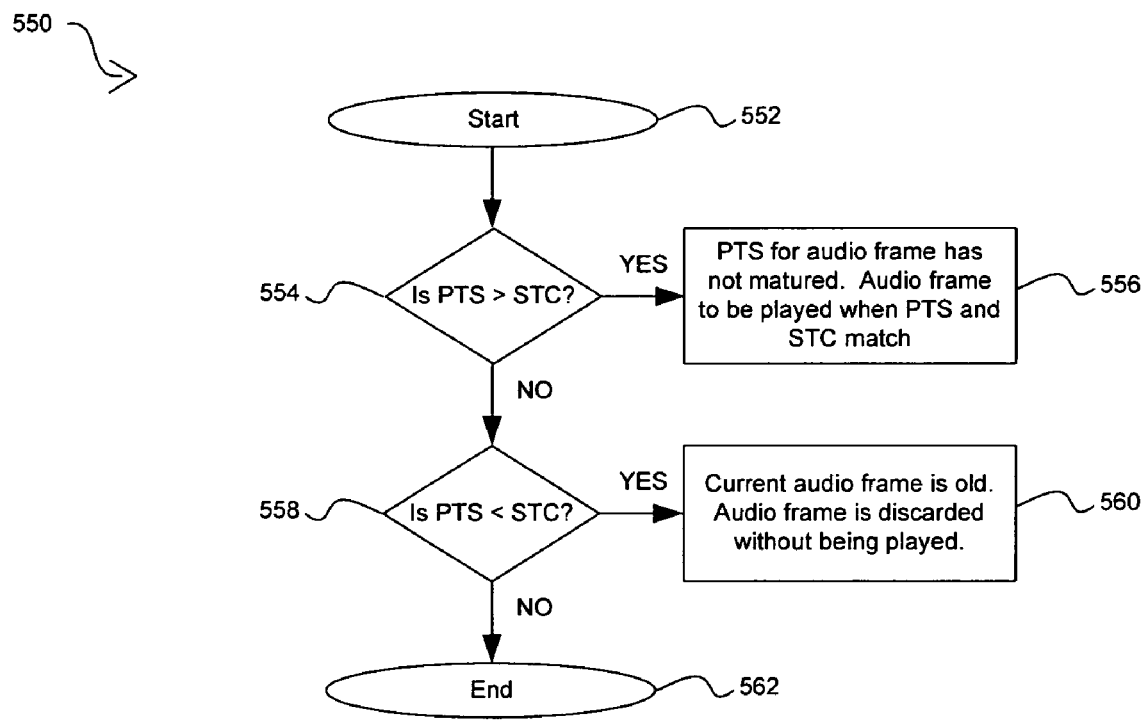
FIG. 5C is a flow diagram illustrating exemplary steps for handling system clock (STC) and presentation time stamp (PTS) mismatch in audio transport, which may be utilized in accordance with an embodiment of the invention.

FIG. 5C is a flow diagram illustrating exemplary steps for handling system clock (STC) and presentation time stamp (PTS) mismatch in audio transport, which may be utilized in accordance with an embodiment of the invention. Referring to FIG. 5C, there is shown a flow diagram 550 of an exemplary handling of STC and PTS mismatch by the audio decoder 504 in FIG. 5A. In step 554, after start step 552, when the comparator 512 determines that PTS>STC, the process may proceed to step 556, otherwise the process may proceed to step 558. In step 556, the comparator 512 may determine that the PTS value for the current audio frame to be decoded has not matured. In this regard, the current audio frame to be decoded may be decoded by the audio decoder 504 but may not be played or presented by the audio device 506 until the PTS and STC values match.

In step 558, when the comparator 512 determines that PTS<STC, the process may proceed to step 560, otherwise the process may proceed to end step 562. In step 560, the comparator 512 may determine that the current audio frame to be decoded is old. In this regard, the current audio frame to be decoded may be discarded by the audio decoder 504 without being played or presented by the audio device 506.

Figure 5D:
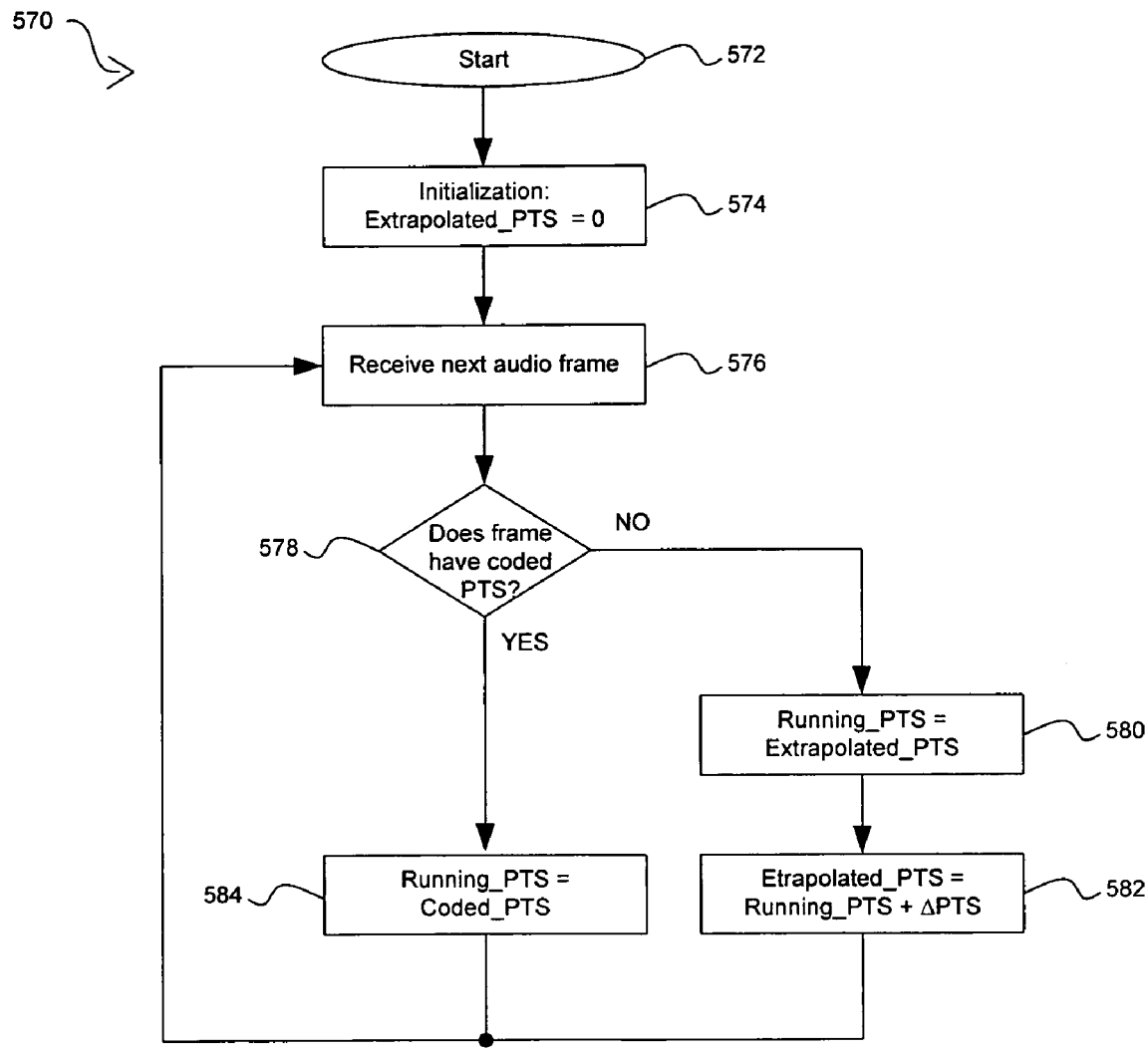
FIG. 5D is a flow diagram illustrating exemplary steps for presentation time stamp (PTS) extrapolation for audio frames without PTS fields, which may be utilized in accordance with an embodiment of the invention.

FIG. 5D is a flow diagram illustrating exemplary steps for presentation time stamp (PTS) extrapolation for audio frames without PTS fields, which may be utilized in accordance with an embodiment of the invention. Referring to FIG. 5D, there is shown a flow diagram 570 of an exemplary extrapolation operation by the PTS extrapolator 510 in FIG. 5A. In step 574, after start step 572, the PTS extrapolator 510 may initialize the extrapolated PTS value, Extrapolated_PTS, to zero, for example. In step 576, the audio decoding and presentation system 500 may receive a next audio frame and the time stamp extractor 508 may be utilized to extract the PTS field value when available. In step 578, when the coded audio frame does not have a corresponding coded PTS field value, Coded_PTS, the process may proceed to step 580. In step 580, the PTS extrapolator 510 may assign to a current PTS value, Running_PTS, the current value of Extrapolated_PTS. In step 582, the PTS extrapolator 510 may generate a new value for Extrapolated_PTS that may be given by the following expression:

$$\text{Extrapolated\_PTS} = \text{Running\_PTS} + \Delta\text{PTS}. \quad (4)$$

In equation (4), the value of ΔPTS may be given by the expression:

$$\Delta PTS = \frac{90000 * \text{sampling\_frequency}}{\text{frame\_size}}, \quad (5)$$

where sampling_frequency corresponds to sampling frequency of the audio information in the audio frame, and frame_size corresponds to the length of the audio information in the audio frame. For the coded audio frames that do not have a corresponding coded PTS field value, the PTS extrapolator 510 may communicate to the comparator 512 the value of Extrapolated_PTS generated in equation (4).

Returning to step 578, when the coded audio frame does have a corresponding PTS field value, the process may proceed to step 584. In step 584, the PTS extrapolator 510 may assign the current PTS value the coded PTS field value, that is, $$\text{Running\_PTS} = \text{Coded\_PTS}. \quad (6)$$

For the coded audio frames that have a corresponding coded PTS field value, the PTS extrapolator 510 may communicate to the comparator 512 the value of Running_PTS generated in equation (6).

In some instances, coded audio frames in the audio decoder buffer 502 may be dropped without decoding as a result of buffer overflow. During overflow conditions, the audio decoder buffer 502 may drop incoming data. For underflow conditions, the audio decoder 504 may wait a pre-determined amount of time for an incoming coded audio frame to be completely stored in the audio decoder buffer 502 before initiating decoding operations.

The approach described herein for synchronizing and displaying or presenting audio and video data may result in a cost effective solution by processing syntax fields, such as SCS and PTS fields, that comprise no more than 32 bits of information. This reduces the number of fetches that are required to acquire data for these fields. Furthermore, since there is no need to process the DTS field, the decoder complexity is reduced. There may not be a need to estimate the decoder delay and the presentation of audio and/or video data may be performed more accurately by being locked to the PTS field. Moreover, the lengths of the SCS field and the PTS field are less than the corresponding fields in MPEG-2 TS, making the syntax comprising the SCS field and the PTS field compatible with MPEG-2 TS.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing packetized information, the method comprising:
    performing by one or more circuits:
        receiving at least one packet in a transport stream comprising a system clock sample (SCS) field;
        receiving at least one packetized elementary stream (PES) packet in said transport stream comprising a presentation time stamp (PTS) field;
        generating an extrapolated PTS field for at least one received PES packet without a PTS field in said transport stream; and
        synchronizing decoding of data in at least one packet in said transport stream based on information in said PTS field or said extrapolated PTS field and said SCS field.

2. The method according to claim 1, wherein said decoded data comprises decoded video data.

3. The method according to claim 2, comprising displaying said decoded video data based on said information in said PTS field and said SCS field.

4. The method according to claim 1, wherein said decoded data comprises decoded audio data.

5. The method according to claim 4, comprising playing said decoded audio data based on said information in said PTS field and said SCS field.

6. The method according to claim 1, wherein said PTS field comprises at least 24 bits of information and not more than 32 bits of information.

7. A machine-readable storage having stored thereon, a computer program having at least one code section for providing wireless communication, the at least one code section being executable by a machine for causing the machine to perform steps comprising:
    receiving at least one packet in a transport stream comprising a system clock sample (SCS) field;
    receiving at least one packetized elementary stream (PES) packet in said transport stream comprising a presentation time stamp (PTS) field;
    generating an extrapolated PTS field for at least one received PES packet without a PTS field in said transport stream; and
    synchronizing decoding of data in at least one packet in said transport stream based on information in said PTS field or said extrapolated PTS field and said SCS field.

8. The machine-readable storage according to claim 7 wherein said decoded data comprises decoded video data.

9. The machine-readable storage according to claim 8, wherein said at least one code section comprises code for displaying said decoded video data based on said information in said PTS field and said SCS field.

10. The machine-readable storage according to claim 7, wherein said decoded data comprises decoded audio data.

11. The machine-readable storage according to claim 10, wherein said at least one code section comprises code for playing said decoded audio data based on said information in said PTS field and said SCS field.

12. The machine-readable storage according to claim 7, wherein said PTS field comprises at least 24 bits of information and not more than 32 bits of information.

13. A system for processing packetized information, the system comprising:
    a buffer that enables receiving at least one packet in a transport stream comprising a system clock sample (SCS) field;
    said buffer enables receiving at least one packetized elementary stream (PES) packet in said transport stream comprising a presentation time stamp (PTS) field; and
    a decoder communicatively coupled to said buffer that enables generating an extrapolated PTS field for at least one received PES packet without a PTS field in said transport stream and synchronizing decoding of data in at least one packet in said transport stream based on information in said PTS field or said extrapolated PTS field and said SCS field.

14. The system according to claim 13, wherein said decoded data comprises decoded video data.

15. The system according to claim 14, comprising a video display communicatively coupled to said decoder that enables displaying of said decoded video data based on said information in said PTS field and said SCS field.

16. The system according to claim 13, wherein said decoded data comprises decoded audio data.

17. The system according to claim 16, comprising an audio device communicatively coupled to said decoder that enables playing of said decoded audio data based on said information in said PTS field and said SCS field.

18. The system according to claim 13, wherein said PTS field comprises at least 24 bits of information and not more than 32 bits of information.

19. A method for processing packetized information, the method comprising:
    performing by one or more circuits:
        receiving at least one packet in a transport stream comprising a system clock sample (SCS) field;
        receiving at least one packetized elementary stream (PES) packet in said transport stream comprising a presentation time stamp (PTS) field;
        synchronizing decoding of data in at least one packet in said transport stream based on information in said PTS field and said SCS field, wherein said SCS field comprises from at least 24 bits of information to 32 bits of information or less.

20. A method for processing packetized information, the method comprising:
    performing by one or more circuits:
        receiving at least one packet in a transport stream comprising a system clock sample (SCS) field;
        receiving at least one packetized elementary stream (PES) packet in said transport stream comprising a presentation time stamp (PTS) field;
        synchronizing decoding of data in at least one packet in said transport stream based on information in said PTS field and said SCS field; and
        receiving said at least one PES packet comprising said PTS field at least once every 700 ms.

21. A method for processing packetized information, the method comprising performing by one or more circuits:

receiving at least one packet in a transport stream comprising a system clock sample (SCS) field;

receiving at least one packetized elementary stream (PES) packet in said transport stream comprising a presentation time stamp (PTS) field;

synchronizing decoding of data in at least one packet in said transport stream based on information in said PTS field and said SCS field; and receiving said at least one packet comprising said SCS field at least once every 100 ms.

22. A machine-readable storage having stored thereon, a computer program having at least one code section for providing wireless communication, the at least one code section being executable by a machine for causing the machine to perform steps comprising:

receiving at least one packet in a transport stream comprising a system clock sample (SCS) field;

receiving at least one packetized elementary stream (PES) packet in said transport stream comprising a presentation time stamp (PTS) field; and synchronizing decoding of data in at least one packet in said transport stream based on information in said PTS field and said SCS field, wherein said SCS field comprises from at least 24 bits of information to 32 bits of information or less.

23. A machine-readable storage having stored thereon, a computer program having at least one code section for providing wireless communication, the at least one code section being executable by a machine for causing the machine to perform steps comprising:

receiving at least one packet in a transport stream comprising a system clock sample (SCS) field;

receiving at least one packetized elementary stream (PES) packet in said transport stream comprising a presentation time stamp (PTS) field;

synchronizing decoding of data in at least one packet in said transport stream based on information in said PTS field and said SCS field; and receiving said at least one PES packet comprising said PTS field at least once every 700 ms.

24. A machine-readable storage having stored thereon, a computer program having at least one code section for providing wireless communication, the at least one code section being executable by a machine for causing the machine to perform steps comprising:

receiving at least one packet in a transport stream comprising a system clock sample (SCS) field;

receiving at least one packetized elementary stream (PES) packet in said transport stream comprising a presentation time stamp (PTS) field;

synchronizing decoding of data in at least one packet in said transport stream based on information in said PTS field and said SCS field; and receiving said at least one packet comprising said SCS field at least once every 100 ms.

25. A system for processing packetized information, the system comprising:

a buffer that enables receiving at least one packet in a transport stream comprising a system clock sample (SCS) field;

said buffer enables receiving at least one packetized elementary stream (PES) packet in said transport stream comprising a presentation time stamp (PTS) field; and a decoder communicatively coupled to said buffer that enables synchronizing decoding of data in at least one packet in said transport stream based on information in said PTS field and said SCS field, wherein said SCS field comprises from at least 24 bits of information to 32 bits of information or less.

26. A system for processing packetized information, the system comprising:

a buffer that enables receiving at least one packet in a transport stream comprising a system clock sample (SCS) field;

said buffer enables receiving at least one packetized elementary stream (PES) packet in said transport stream comprising a presentation time stamp (PTS) field;

a decoder communicatively coupled to said buffer that enables synchronizing decoding of data in at least one packet in said transport stream based on information in said PTS field and said SCS field; and a time stamp extractor that enables receiving said at least one PES packet comprising said PTS field at least once every 700 ms.

27. A system for processing packetized information, the system comprising:

a buffer that enables receiving at least one packet in a transport stream comprising a system clock sample (SCS) field;

said buffer enables receiving at least one packetized elementary stream (PES) packet in said transport stream comprising a presentation time stamp (PTS) field;

a decoder communicatively coupled to said buffer that enables synchronizing decoding of data in at least one packet in said transport stream based on information in said PTS field and said SCS field; and a time stamp extractor that enables receiving said at least one packet comprising said SCS field at least once every 100 ms.

* * * * *